United States Patent
Cala'

(10) Patent No.: US 9,275,000 B2
(45) Date of Patent: Mar. 1, 2016

(54) ELECTRONIC DEVICE WITH ADDRESS PROGRAMMABLE THROUGH REDUCED NUMBER OF TERMINALS

(75) Inventor: Ignazio Cala', Syracuse (IT)

(73) Assignee: STMICROELECTRONICS S.R.L., Agrate Brianza (MB) (IT)

( * ) Notice: Subject to any disclaimer, the term of this patent is extended or adjusted under 35 U.S.C. 154(b) by 249 days.

(21) Appl. No.: 13/296,358

(22) Filed: Nov. 15, 2011

(65) Prior Publication Data

US 2012/0137022 A1     May 31, 2012

(30) Foreign Application Priority Data

Nov. 29, 2010   (IT) ............................... MI2010A2214

(51) Int. Cl.
G06F 3/00      (2006.01)
G06F 13/42     (2006.01)

(52) U.S. Cl.
CPC .... G06F 13/4291 (2013.01); *G06F 2213/0016* (2013.01); *G06F 2213/0052* (2013.01)

(58) Field of Classification Search
None
See application file for complete search history.

(56) References Cited

U.S. PATENT DOCUMENTS

| | | | | |
|---|---|---|---|---|
| 7,484,027 | B1 * | 1/2009 | Dahlin | 710/305 |
| 8,112,569 | B2 * | 2/2012 | Vitanescu | 710/305 |
| 2001/0029554 | A1 | 10/2001 | Namba | |
| 2007/0250648 | A1 * | 10/2007 | Picard et al. | 710/9 |
| 2011/0055442 | A1 * | 3/2011 | Ward et al. | 710/110 |

FOREIGN PATENT DOCUMENTS

WO     2006117753 A1     11/2006

OTHER PUBLICATIONS

Italian Search Report dated Jun. 10, 2011 from corresponding Italian Application No. MI2010A0002214.
Written Opinion dated Jun. 10, 2011 from corresponding Italian Application No. MI2010A0002214.

* cited by examiner

*Primary Examiner* — Henry Tsai
*Assistant Examiner* — Dean Phan
(74) *Attorney, Agent, or Firm* — Allen, Dyer, Doppelt, Milbrath & Gilchrist, P.A.

(57) ABSTRACT

An electronic device includes a set of programming terminals for receiving corresponding programming signals, and assignment circuitry for assigning an address to the electronic device according to the programming signals. The assignment circuitry includes circuitry for providing a set of comparison signals, with at least part of the comparison signals that is variable during a non-zero comparison interval, and comparison circuitry for determining the address according to a comparison between the programming signals and the comparison signals during the comparison interval.

18 Claims, 7 Drawing Sheets

ELECTRONIC DEVICE WITH ADDRESS PROGRAMMABLE THROUGH REDUCED NUMBER OF TERMINALS

CROSS REFERENCE TO RELATED APPLICATIONS

This application claims the priority benefit of Italy patent application number MI2010A002214, filed on Nov. 29, 2010, entitled ELECTRONIC DEVICE WITH ADDRESS PROGRAMMABLE THROUGH REDUCED NUMBER OF TERMINALS, which is hereby incorporated by reference to the maximum extent allowable by law.

BACKGROUND OF THE INVENTION

1. Field of the Invention

The solution according to one or more embodiments generally relates to electronic devices. More specifically, such solution relates to the programming of electronic devices.

2. Discussion of the Related Art

Electronic devices (e.g., integrated electronic devices) may be used in complex electronic systems for carrying out specific functionalities thereof. For such purpose, electronic devices present within an electronic system should be able to interact with each other; for example, in a typical electronic system, often an electronic device having control functions (such as a microcontroller) should interface with different peripheral electronic devices (e.g., memories, converters, sensors, and the like) for performing certain operations thereon.

In order to allow electronic devices within the same electronic system to communicate with each other, typically each one of such electronic devices is connected to a set of shared lines, called a bus, along which data, in the form of binary digits (or bits), and/or other electrical signals are exchanged.

In order to ensure that the communication among the electronic devices occurs correctly, it is necessary to establish a set of communication rules defined by a corresponding communication protocol.

For example, a widely used communication protocol, called I2C ("Inter Integrated Circuit"), allows communication among different electronic devices connected to each other through a same serial bus with two bi-directional transmission lines, i.e. a line carrying data (or data line) and a line carrying a synchronization signal (or clock line). Such I2C protocol also provides that there is at least one electronic device acting as a master able to request a communication towards one or more slave electronic devices addressed by it.

Therefore, it is important that each slave electronic device connected to the same bus is uniquely identifiable by a corresponding address. In particular, when a master electronic device wants to start a communication, it provides, through the data line, the address of the slave electronic device with which it wants to communicate to all the slave electronic devices connected to the same bus; the latter ones receive the address (through a corresponding communication interface, called I2C interface) and, according to a value thereof, enable or not the communication of the corresponding slave electronic device with the master electronic device.

In general, the address of the slave electronic device is defined by a string of bits. The address of the slave electronic device is usually programmed in field (so as to allow producing slave electronic devices equal to each other, which are programmed differently). For such purpose, the slave electronic device is provided with N programming pins, each one of which is connected to a ground line or to a supply line, for setting a corresponding bit of the address to the logical value 0 or 1, respectively. For addressing a number N of slave electronic devices, it is necessary to use an address with $P=INT[\log_2 N]$ bits, and hence an equal number of programming pins.

Although in principle the number of slave electronic devices connectable to the same bus may be relatively large, and depending substantially on bus parameters (e.g., capacity and speed of the same), typically such number is limited by the number programming pins that, consistently with size and functionality of the slave electronic devices, may be effectively used for programming the address.

For example, a relatively common version of the I2C protocol uses a 7-bit address; the 7 bits of the address of each slave electronic device are logically divided into two packets of bits, a packet including bits fixed by a manufacturer of the slave electronic device (most significant bits), and another packet including variable bits (least significant bits) actually programmed through the respective programming pins. For example, some recent versions of the I2C protocol provide that, among the seven bits of the address, the most significant bits are the first five, whereas the least significant bits are the remaining two; in this way, the two least significant bits, which may actually distinguish four different slave electronic devices connected to the same bus, involve the use of two programming pins for each slave electronic device.

However, in certain applications, the programming pins for each slave electronic device, although reduced in number, may involve a remarkable technological limit. In fact, with the more and more increasing trend toward miniaturization of the slave electronic devices, the latter are getting smaller and smaller, and thus they have a correspondingly limited total number of pins (given by the programming pins and by functional pins dedicated to functionalities of the electronic device). However, since the miniaturization of the slave electronic devices is usually contextual to an increase (or at least a non-reduction) of the functionalities of the same, the number of functional pins (affecting the functionalities of the slave electronic device) may not be reduced significantly; therefore, in such condition, the number of programming pins for each slave electronic device may have a significant impact in percentage on the total number of pins (so that even only two programming pins for each slave electronic device may be limiting).

SUMMARY OF THE INVENTION

One or more embodiments are based on the idea of using a time variation of programming signals for determining the address.

Embodiments of the invention are set out in the independent claims, with advantageous features indicated in the dependent claims (whose wording is enclosed herein verbatim by reference).

More specifically, according to an embodiment, there is provided an electronic device (for example, a slave electronic device). The electronic device includes a set of programming terminals (for example, one or more pins) for receiving corresponding programming signals, and assignment means for assigning an address to the electronic device (for example, a 7-bit address including a fixed portion and an actually programmable variable portion) according to the programming signals. According to an embodiment, the assignment means includes means for providing a set of comparison signals (for example, ground, supply, data and synchronization signals), with at least part of the comparison signals (for example, the data and the synchronization signals) that is variable during a non-zero comparison interval (defined, for example, by a time necessary to send the fixed portion of the address), and comparison means (for example, a logic network including combinatory and sequential elements) for determining the address according to a comparison between the programming signals and the comparison signals during the comparison interval.

Another embodiment provides a complex system including one or more of such electronic devices.

According to an embodiment, there is provided a corresponding programming method (with the same advantageous features recited in the dependent claims for the electronic device that applies mutatis mutandis to the method).

BRIEF DESCRIPTION OF THE DRAWINGS

One or more embodiments of the invention, as well as further features and the advantages thereof, will be best understood with reference to the following detailed description, given purely by way of a non-restrictive indication, to be read in conjunction with the accompanying drawings (wherein corresponding elements are denoted with equal or similar references, and their explanation is not repeated for the sake of exposition brevity). In this respect, it is expressly understood that the figures are not necessarily drawn to scale (with some details that may be exaggerated and/or simplified) and that, unless otherwise indicated, they are simply used to conceptually illustrate the described structures and procedures. In particular.

DETAILED DESCRIPTION

Figure 1A:
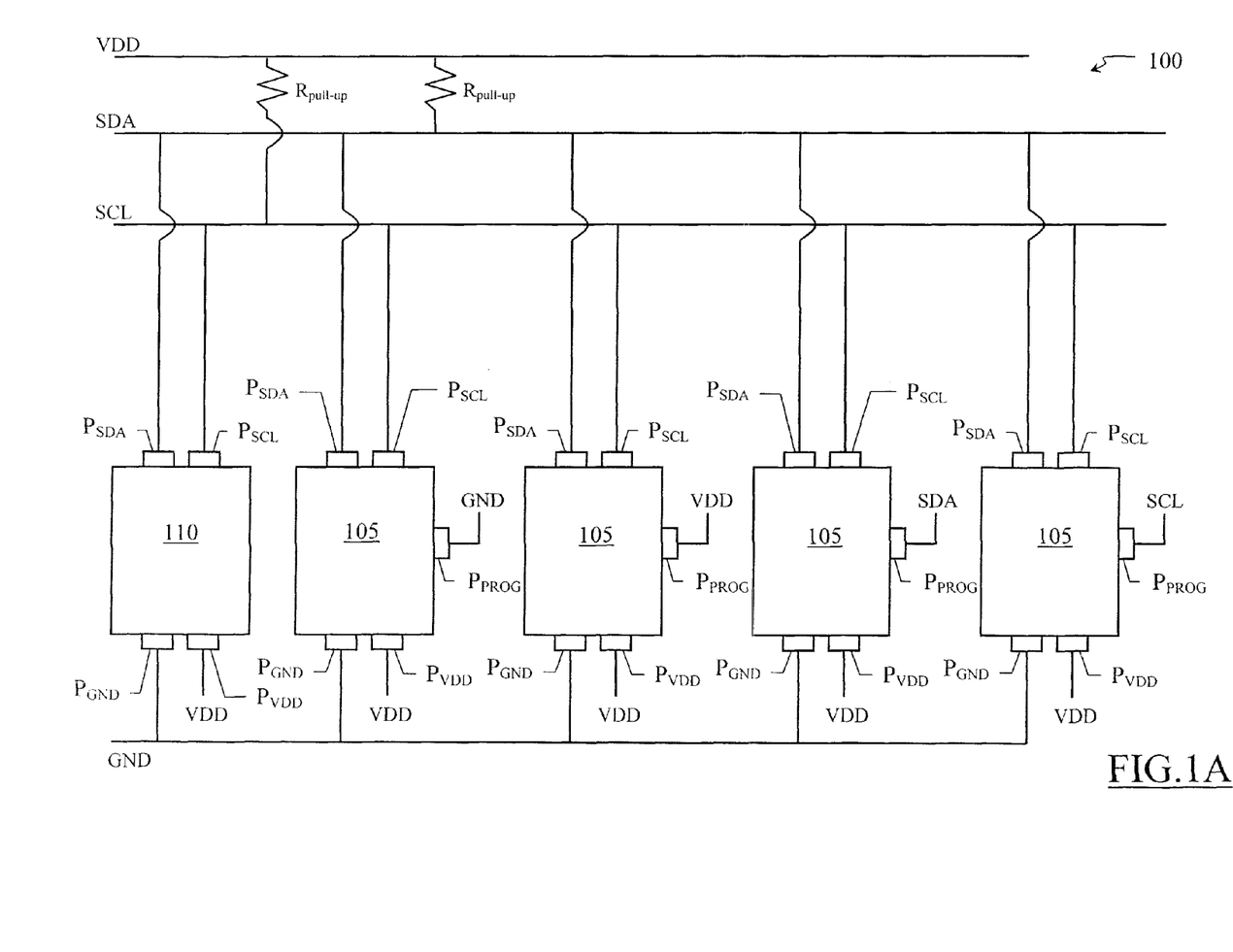
FIG. 1A schematically shows an electronic system according to an embodiment.

FIG. 1A schematically shows an electronic system 100 according to an embodiment. The electronic system 100 includes a plurality of electronic devices; in particular, the electronic system 100 includes electronic devices 105 (four, in the example in the figure) acting as slaves (i.e., able to be addressed for receiving a communication request), and electronic devices 110 (one, in the example in the figure) acting as masters (i.e., able to address each slave electronic device 105 individually for requesting a communication with the same). The slave electronic devices 105 may be functionally different from each other (for example, they may be memories, converters, sensors, or the like), although in the figure, for the sake of simplicity, they are represented by analogous functional blocks.

Each electronic device 105,110 is connected to same communication lines that implement a bidirectional bus I2C (through which the electronic devices 105,110 may exchange operative signals according to an I2C communication protocol). More particularly, such bus includes a data line SDA ("Serial Data"), over which data signals are exchanged in the form of bits (which may represent information or addresses) among the master electronic device 110 and the slave electronic devices 105, and a synchronization line SCL ("Serial Clock"), over which the master electronic device 110 sends a clock signal to the slave electronic devices 105. The signals over the bus SDA,SCL may take, over time, a low logical value or 0 (for example, defined by a ground voltage supplied by a ground line GND) and a high logical value or 1 (for example, defined by a supply voltage VDD, such as VDD=3.3 V with respect to the ground voltage, provided by a supply line VDD).

The electronic system 100 further includes two pull-up resistors $R_{pull-up}$, each one of which is connected between a corresponding line SDA,SCL and the line VDD. Such pull-up resistors $R_{pull-up}$ are generally used for keeping the bus SDA, SCL at a fixed logic level, in the specific case at the high logic level, in the absence of communication between the electronic devices 105,110.

Each electronic device 105,110 includes two reference pins $P_{GND},P_{VDD}$ and two functional pins $P_{SDA},P_{SCL}$. The pin $P_{GND}$ and the pin $P_{VDD}$ are connected to the line GND and the line VDD, respectively; the pin $P_{SDA}$ and the pin $P_{SCL}$ are connected to the line SDA and the line SCL, respectively. According to an embodiment of the invention, each electronic device 105 includes a single programming pin $P_{PROG}$ for programming an address thereof in a unique way. As shown in FIG. 1A, the pin $P_{PROG}$ of each slave electronic devices device 105 is connected in a fixed way to a different one of the lines GND, VDD, SDA and SCL; in particular, in the exemplary illustrated embodiment, the pins $P_{PROG}$ of the slave electronic devices 105 are connected, from left to right, to the line GND, to the line VDD, to the line SDA and to the line SCL, respectively.

Figure 1B:
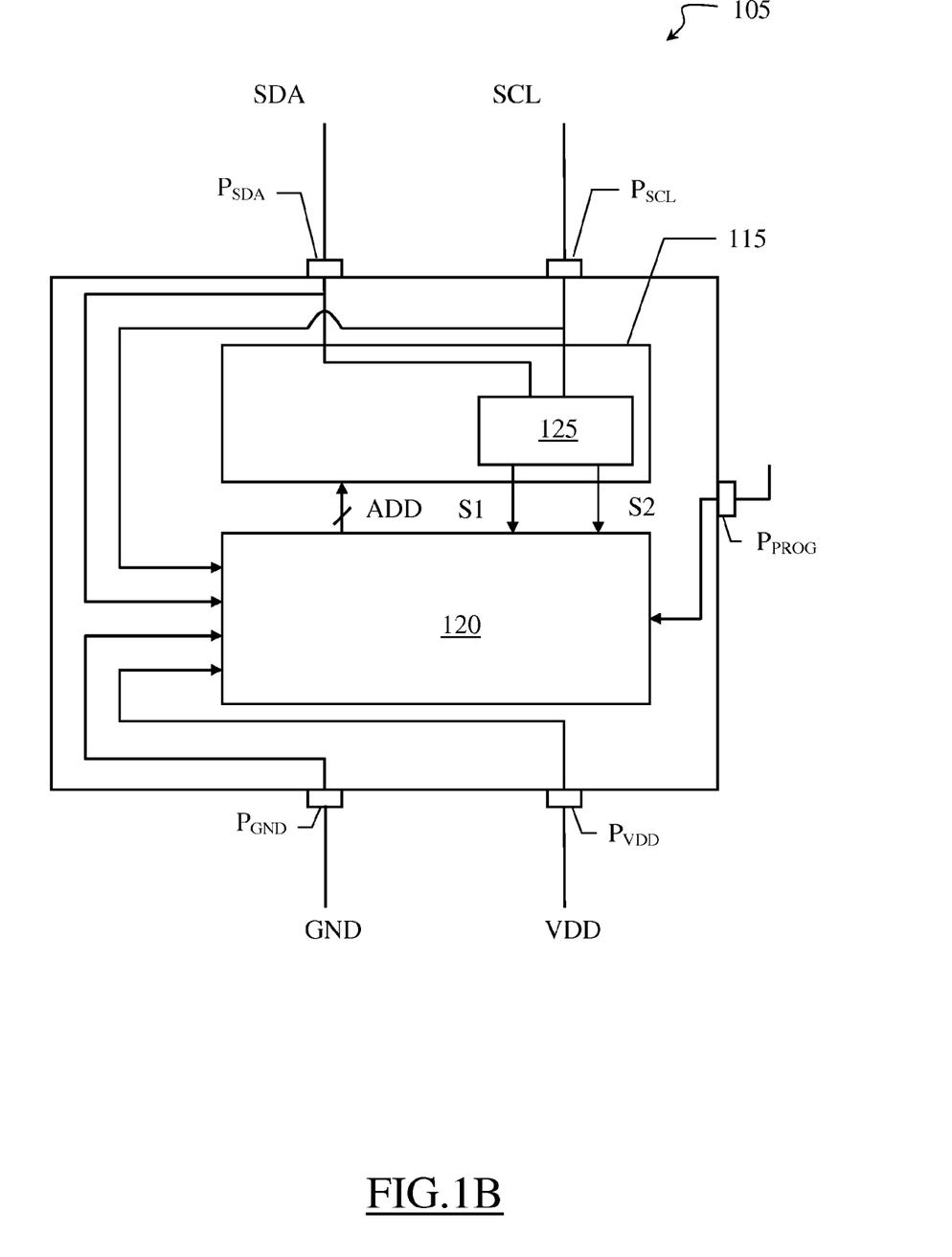
FIG. 1B schematically shows an electronic device according to an embodiment.

FIG. 1B schematically shows an electronic device according to an embodiment.

Each slave electronic device 105, schematically shown in FIG. 1B, includes an interface block 115 connected to the pins $P_{SDA}$ and $P_{SCL}$ (for receiving the signal from the line SDA, or signal SDA, and the signal from the line SCL, or signal SCL), and able to perform communication functions (e.g., serial acquisition and/or sending of temporized information of the signal SCL) with the master electronic device 110, or processing functions (e.g., addresses acquisition and recognition).

According to an embodiment, the slave electronic device 105 further includes an assignment block 120, which receives a programming signal applied to the pin $P_{PROG}$, or signal PROG, a plurality of comparison signals equal to the different signals PROG that may be applied to the pin $P_{PROG}$ (i.e., the signals GND, VDD, SDA and SCL), and a pair of initialization signals S1,S2, and provides an address ADD—for example, a 7-bit address—of the slave electronic device 105 to the interface block 115 (according to the signal PROG).

The slave electronic device 105 further includes (internally, as illustrated in the figure, or externally, to the interface block 115) an initialization block 125, which receives the signals SDA,SCL, and provides the signals S1,S2 to the assignment block 120.

According to an embodiment (as described in detail in the following), the address ADD is determined according to a comparison over time between the signal PROG and the signals GND, VDD, SDA, SCL. In fact, in this case at least part of the signals GND, VDD, SDA, SCL is variable over time (i.e., the signals SDA, SCL in the case at issue); therefore, after a certain period of time it is possible to recognize the signal PROG (for example, for determining when it is equal to one of the signals GND, VDD, SDA, SCL). In other words, the information necessary for determining the address ADD is at least partially encoded in time (through the signal PROG) rather than in space (through a corresponding number of programming signals).

In such way, it is possible to reduce the number of programming pins accordingly; in fact, the number of possible values of the address is now defined in combination by the number of comparison signals and the number of programming pins. In particular, it is possible to make the number of programming pins also totally independent of the number of address values, on condition of providing a corresponding number of comparison signals (down to only one programming pin for any number of address values). Therefore, it is possible to reduce the total number of pins (and hence the size of the slave electronic device) for the same functional pins, or increase the number of functional pins (and hence the functionality of the slave electronic device) for the same size thereof.

Obviously, the assignment (or programming) operation of the address is not instantaneous (since the corresponding information has been distributed, at least partly, over time); however, in practice this is not a problem, since such operation may be performed only once (for example, at the power-on of the slave electronic device), thus without any practical impact on its normal operation, or (for avoiding electrical power wastes) at each addressing operation by the master electronic device; in the latter case, the address assignment takes place within the end of each addressing operation.

Moreover, in the specific embodiment described above, the signals GND, VDD, SDA, SCL are all already available within the slave electronic device 105 for other purposes, and they may be directly taken from the corresponding pins $P_{GND}$, $P_{VDD}$, $P_{SDA}$, $P_{SCL}$; therefore, the assignment operation of the address ADD has a small impact on the structure of the slave electronic device 105.

In the specific example described above, the slave electronic device 105 needs a single pin $P_{PROG}$ to determine one by choice (according to the signal applied thereto) of four possible values of the address ADD (for example, with a portion of the address variable between 00, 01, 10 and 11 when the programming signal PPROG is equal to the signal GND, VDD, SDA and SCL, respectively); in this respect, it should be noted that, in the known solutions, for obtaining the same number of values of the address ADD, the slave electronic device 105 would need two programming pins (for receiving programming signals fixed at the logic level 0 or the logic level 1 in one of the four possible configurations 00, 01, 10, 11). In this way, even in the presence of a strong miniaturization of the slave electronic device 105, the number of programming pins has a lower impact in percentage with respect to a total number of functional pins; therefore, this allows achieving a reduction in the size of the slave electronic devices without worsening the functionalities thereof.

Figure 2:
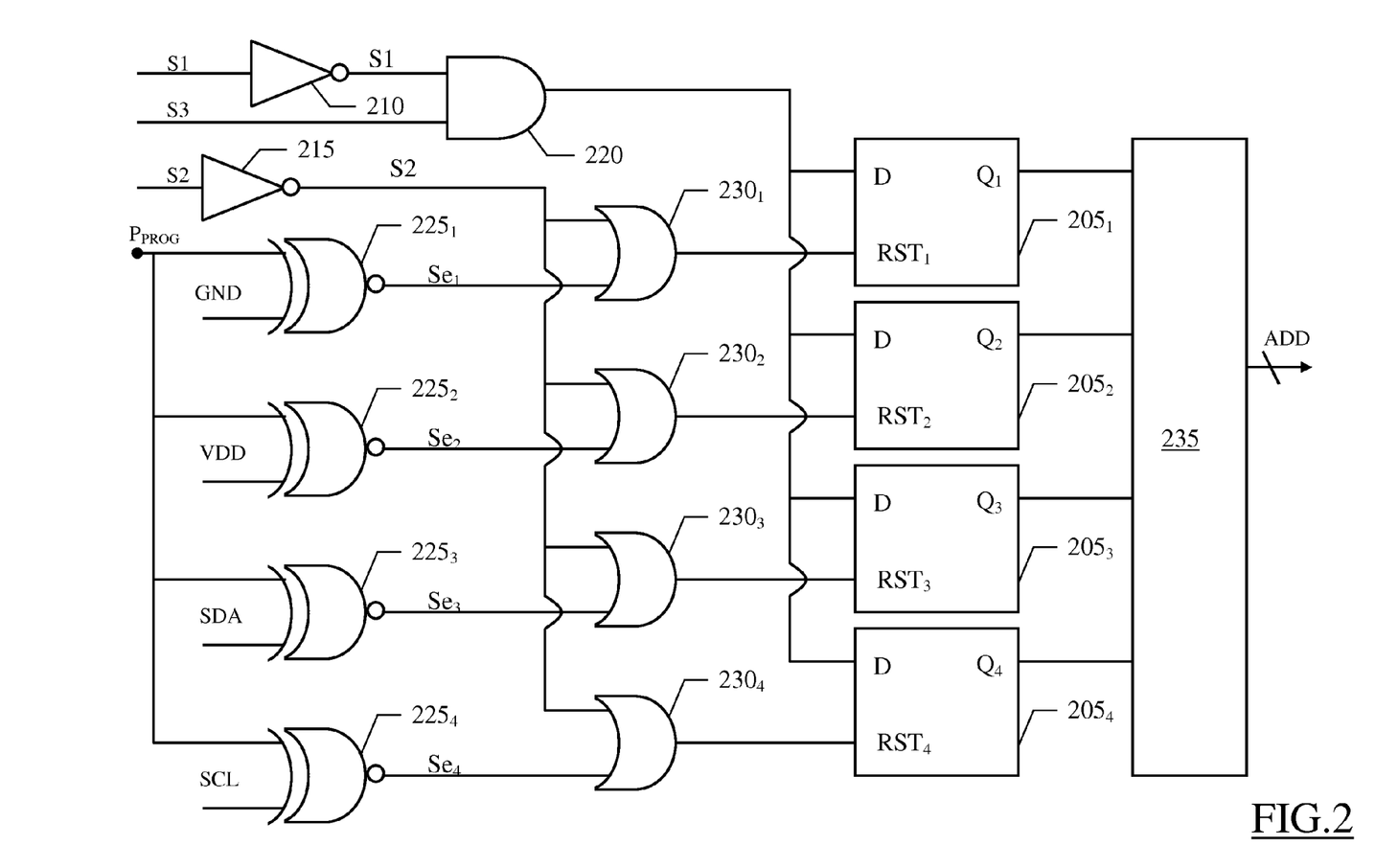
FIG. 2 shows a circuit scheme of an assignment block according to an embodiment.
Figure 3A:
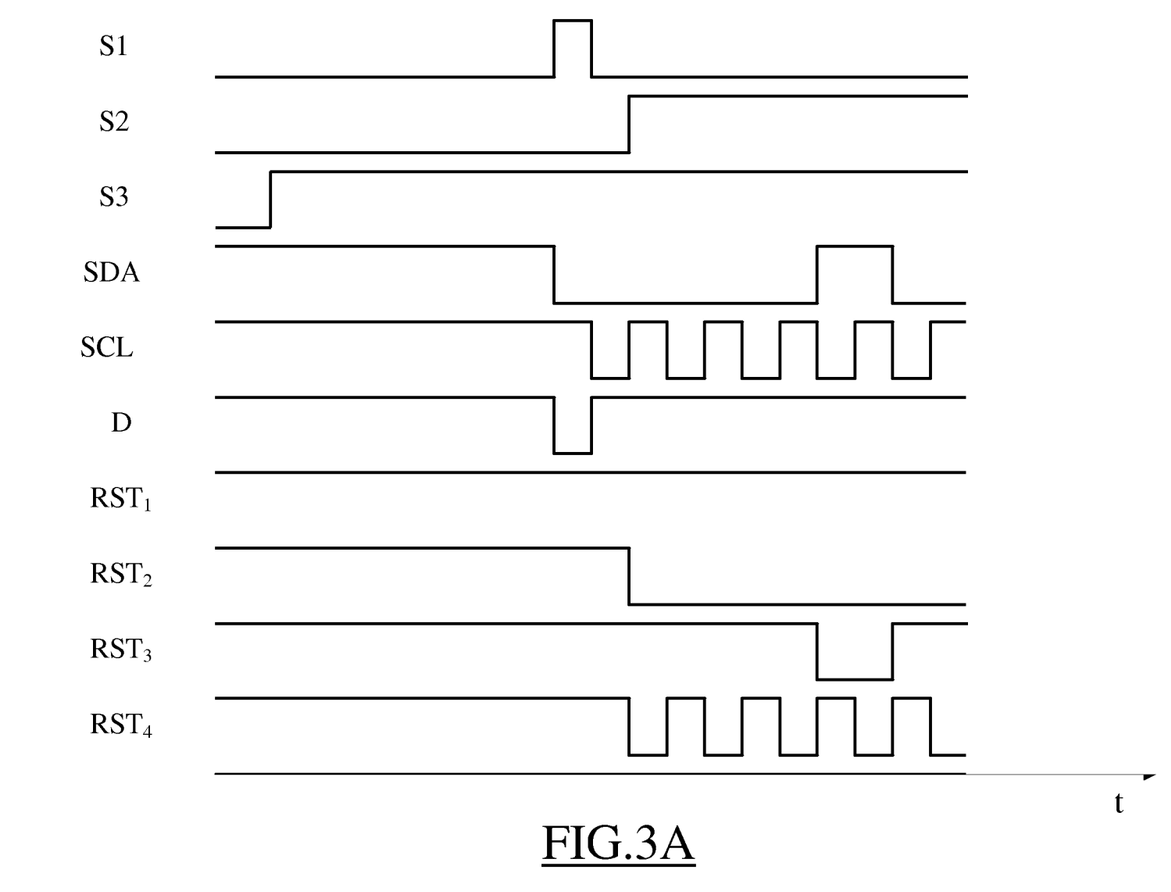
FIG. 3A-3D show qualitative timing diagrams of significant signals of the assignment block of FIG. 2 in different configurations according to an embodiment.
Figure 3B:
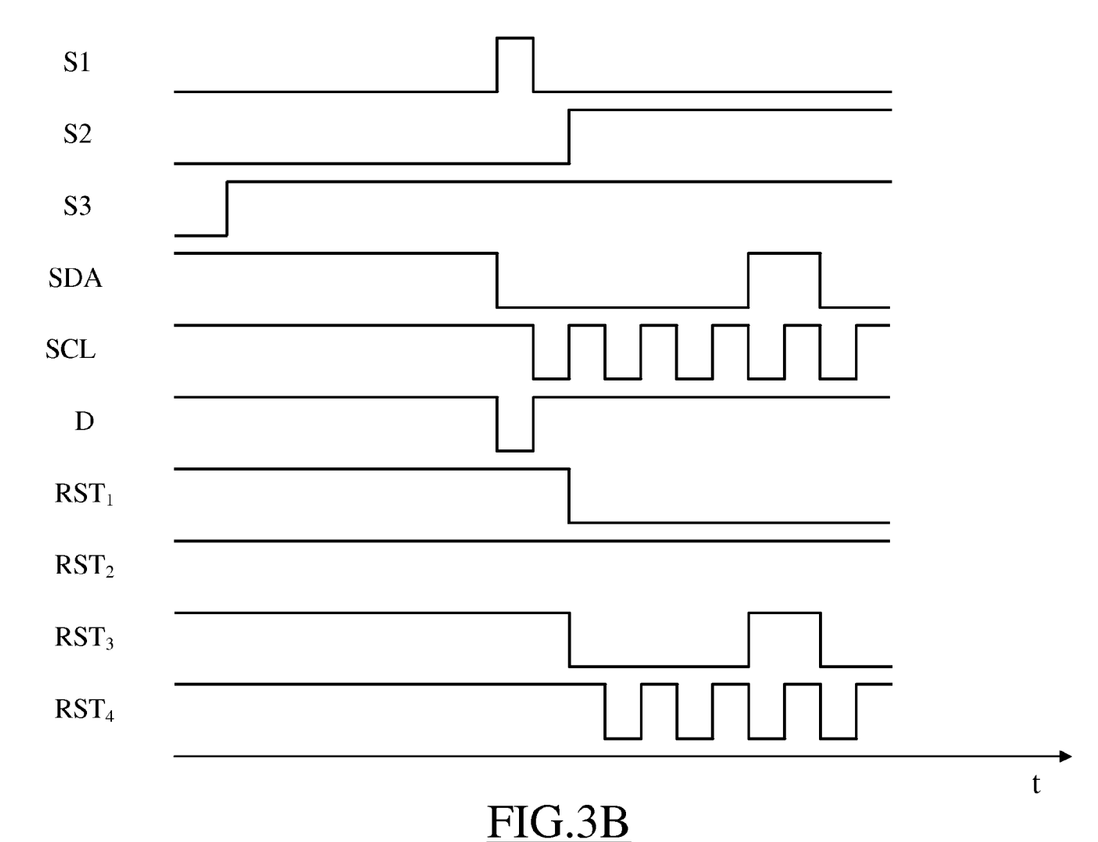
Figure 3C:
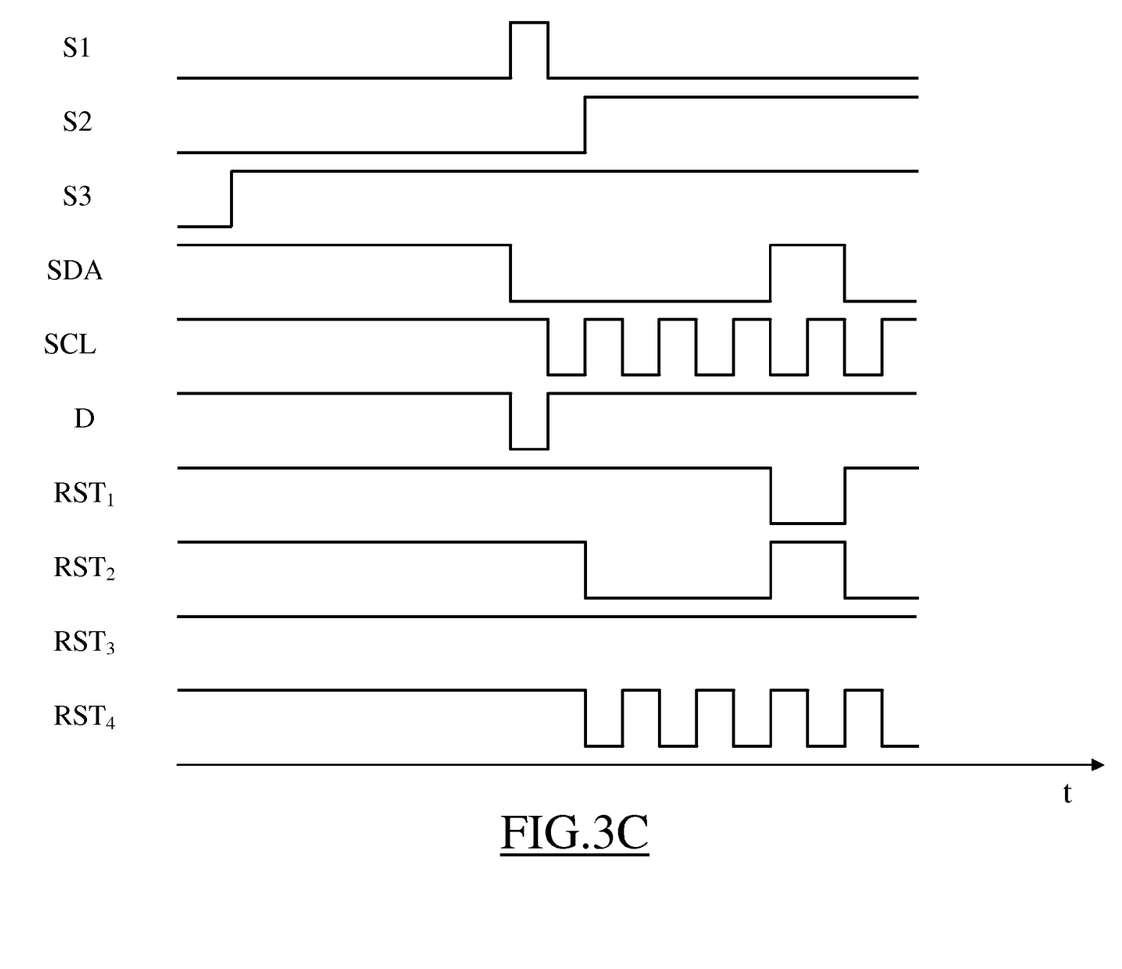
Figure 3D:
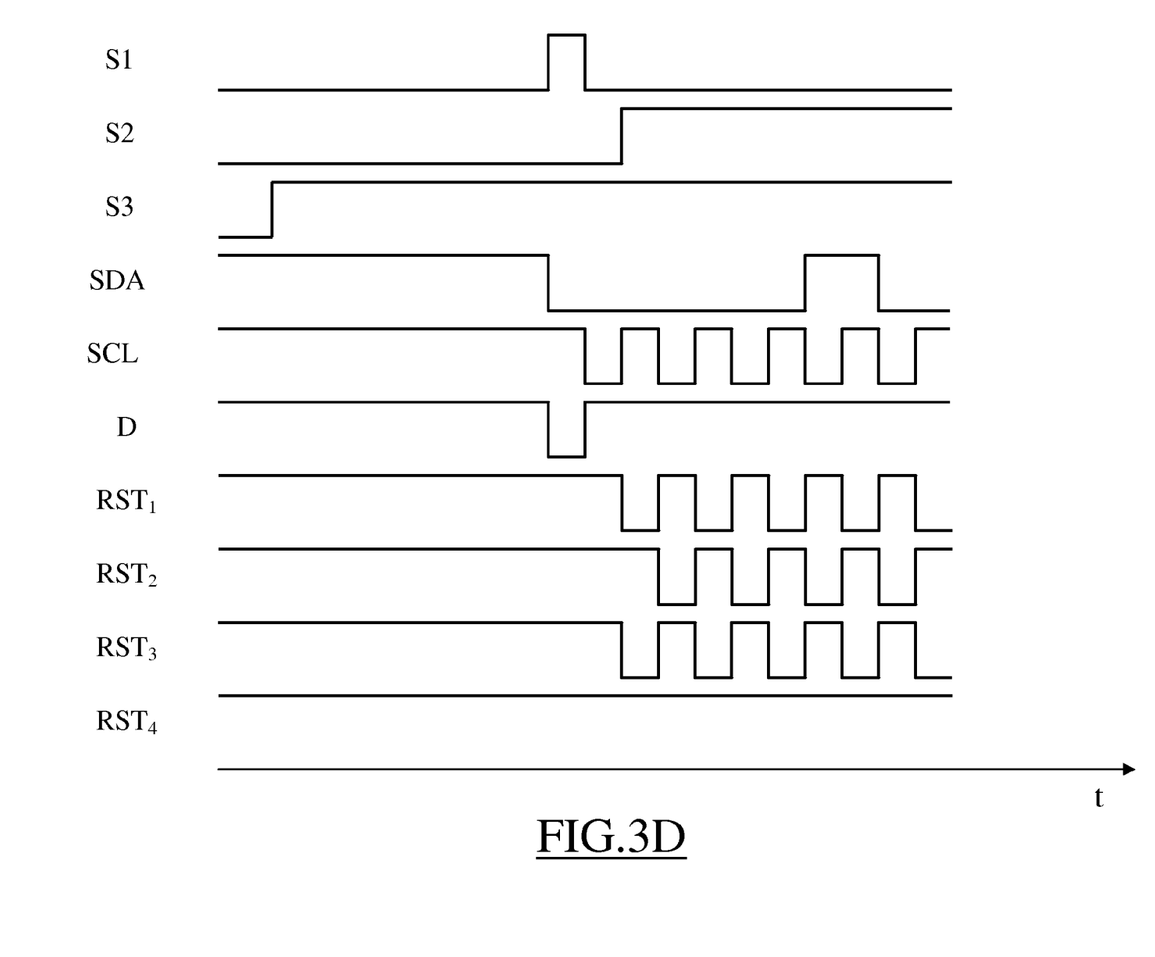

FIG. 2 shows a circuit schematic of the assignment block 120 according to an embodiment.

The assignment block 120 includes a bistable element (or latch) $205_1$, i.e. a memory element able to store binary data; the latch $205_1$ includes a data terminal D and an initialization terminal $RST_1$ for receiving the data to be stored and a signal for resetting the latch $205_1$, respectively, and an output terminal $Q_1$ for providing the stored data. In the exemplary described embodiment, the latch $205_1$ is active low, i.e. the storing occurs when both the signals present at the terminals D and $RST_1$ (or signals D and $RST_1$) are at the high logic level. Moreover, the latch $205_1$ is configured so that with the signals D and $RST_1$ at the high and low logic levels, respectively, the signal at the terminal $Q_1$ (signal $Q_1$) is at the low logic level, whereas with the signals D and $RST_1$ at the low and high logic levels, respectively, the signal $Q_1$ is at the high logic level. The condition for which the signals D and $RST_1$ are both at the low logic level is a condition that should be avoided, as intrinsically involving uncertainty of the signal $Q_1$.

The assignment block 120 also includes three further latches $205_2$, $205_3$, $205_4$ analogous to the latch $205_1$, and wherein the corresponding initialization and output terminals (and the respective signals) are denoted by similar references (but differentiated by the subscript 2, i.e. $RST_2$, and $Q_2$, the subscript 3, i.e. $RST_3$, and $Q_3$, and by the subscript 4, i.e. $RST_4$, and $Q_4$, respectively); instead, as visible in the figure, the data terminals of the latch $205_1$, $205_2$, $205_3$, $205_4$, all connected to each other, are denoted by the same reference D.

The assignment block 120 also includes a logic inverter 210 and a further logic inverter 215 (e.g., both in CMOS logic); the logic inverter 210 is input the signal S1 and outputs a corresponding negated signal S1, whereas the logic inverter 215 is input the signal S2, and outputs a corresponding negated signal S2.

The assignment block 120 further includes an AND logic gate 220 having two input terminals and one output terminal; in particular, such AND logic gate 220 is input the signal S1 and a signal S3 that is asserted (e.g., at the high level logic) at the power-on of the slave electronic device, and outputs the corresponding signal D to the latches $205_1$, $205_2$, $205_3$, $205_4$.

The assignment block 120 also includes four EXNOR logic gates $225_1$, $225_2$, $225_3$ and $225_4$ each one having two input terminals and one output terminal, and four OR logic gates $230_1$, $230_2$, $230_3$ and $230_4$ each one having two input terminals and one output terminal. In particular, an input terminal of the EXNOR logic gates $225_1$, $225_2$, $225_3$ and $225_4$ is connected to the pin $P_{GND}$ (for receiving the ground voltage GND), to the pin $P_{VDD}$ (for receiving the supply voltage VDD), to the pin $P_{SDA}$ (for receiving the signal SDA) and to the pin $P_{SCL}$ (for receiving the signal SCL), respectively; the other input terminal of each EXNOR logic gate $225_i$ (with i=1-4) is connected to the pin $P_{PROG}$, whereas its output terminal outputs a corresponding equality signal $Se_i$. Instead, an input terminal of each OR logic gate is connected to the output terminal of the corresponding EXNOR logic gate $225_i$ (for receiving the signal $Se_i$), whereas the other input terminal thereof receives the same signal S2. The output terminal of the OR logic gate $230_i$ provides the corresponding signal $RST_i$.

The assignment block 120 also includes a decoder 235 having 4 input lines and 7 output lines; in particular, the input lines of the decoder 235 receive the signals $Q_1$, $Q_2$, $Q_3$, $Q_4$, respectively, whereas the output lines provide the 7-bit address ADD of the slave electronic device; in particular, the address ADD includes, in the described embodiment, five fixed address bits (e.g., 00010) and two variables bits (00, 01, 10 and 11) according to the values taken by the signals $Q_1$, $Q_2$, $Q_3$, $Q_4$.

FIG. 3A-3D show qualitative time diagrams of significant signals of the assignment block 120 in different configurations according to an embodiment; in particular FIG. 3A-3D show qualitative time diagrams of the logic levels taken by the signals S1-S3, SDA, SCL, D, $RST_i$ before and during the sending of the fixed address bits (00010, in the example at issue), when the programming terminal is connected to the lines GND, VDD, SDA, SCL, respectively.

The operation of the assignment block 120 according to the described embodiment may be summarized as follows (with reference to FIG. 3A-3D jointly with FIG. 2).

In a shutdown condition of the slave electronic device, the signals SDA, SCL are asserted (e.g., at the high logic level) due to the pull-up resistors, whereas the signals S1, S2 and S3 are de-asserted (at the low logic level).

At the power-on of the slave electronic device, after a predetermined period of time (depending on power-on reset circuitries), the signal S3 is asserted (and remains in such state until its shut-down). In such condition, the signal D is asserted (since the AND gate 220 receives the signals S1 and S3 both asserted at its input terminals), whereas, since each OR gate 230$_i$ receives the signal S2 being asserted at a respective input terminal, the signals RST$_i$ are all asserted regardless of the signals Se$_i$. In such condition, the latches 205$_i$ are in the storing condition, and hence each signal Q$_i$, remains asserted according to the state taken before the commutation by the signal S3 (in fact, during said fixed time interval, wherein the signal S3 has not yet been asserted, the latches 205$_i$ are in the set condition, with the respective signals Q$_i$ asserted). Therefore, at the power-on of the slave electronic device, the signals Q$_i$ are all asserted (initial setting phase).

In such condition (and as long as the master electronic device does not start a first communication), the slave electronic device is in an idle state, so that the decoder 235, being input the signals Q$_i$ does not output any address. For example, the decoder 235 may be provided, in a known manner, with an enable signal, not shown in the figure for the sake of simplicity, that enables the decoding of the address ADD from the signals Q$_i$ only at a properly predetermined time; for example, in the shown implementation, the decoding may be enabled at the end of the sending of the first 5 (fixed) address bits, at which, as will be explained in the following, the assignment block 120 has already calculated the values of the signals Q$_1$, Q$_2$, Q$_3$, Q$_4$ from which decoding the address ADD.

The start of each communication (during which the assignment operation of each slave electronic device occurs) is detected by the slave electronic device when the master electronic device de-asserts the signal SDA (according to the I2C protocol); as soon as this occurs, the signal S1 is asserted, and as a consequence the signal D is de-asserted (with the signals RST$_i$ that continues being asserted). In this way, the latches 205$_i$ are in the set condition (wherein the signals Q$_i$ are all asserted), which identifies an initialization phase of the assignment block. It should be noted that such initialization phase, differently from the initial setting phase (that is performed only at the power-on of the device), is executed at the start of each new communication; in this way, it is possible to avoid that electrical interference or electronic noise, which may affect the slave electronic device between its power-on and the start of the communication, might cause spurious switching of the signals, and hence an alteration of the operation of the assignment block.

Such initialization phase lasts until the signal S1 is asserted; then, when the signal SCL is de-asserted (with timings depending on the I2C protocol), the signal S1 is de-asserted and remains in such state until the end of the communication. In this way, the latches 205$_i$ are in the storing condition, and hence the signals Q$_i$ are kept asserted.

At the next commutation of the signal SCL, indicating that an address is going to be sent, the signal S2 is asserted (and remains in such state until the end of the operation); this defines the start of the assignment operation.

In fact, at this point, the OR gates 230$_i$ will have the signal S2 de-asserted at one of their terminals; therefore, the signals RST$_i$ (output from the respective OR gates 230$_i$) will be asserted or de-asserted according to the values taken by the signals Se$_i$ (and hence according to the programming signal at the pin P$_{PROG}$).

For example, in case that the pin P$_{PROG}$ is connected to the line GND (see, in this respect, FIG. 3A), the signal Q$_2$ is de-asserted, since the latch 205$_2$ is reset; in fact, in such condition, the signal RST$_2$ is de-asserted, since the signal Se$_2$ output from the EXNOR gate 225$_2$ is de-asserted, whereas the signal D remains asserted (since no switching of the signals S1,S3 has occurred). Moreover, as soon as the signals SDA and SCL are asserted, also the signals Q$_3$ and Q$_4$ are de-asserted—in this respect, it should be noted that, in order not to generate situations of uncertainty of the address, the signal SDA should be asserted at least once during the assignment operation, and therefore the fixed portion of the address should include at least one bit at the high logic level (in the example at issue, in fact, the fixed portion of the address has a value 00010). Instead, the signal Q$_1$ remains asserted, since the EXNOR gate 225$_1$, being input two signals at the same (low) logic level, provides the signal Se$_1$ asserted inputs to the OR gate 230$_1$ (which implies that the signal RST$_1$ remains asserted, thereby maintaining the latch 205$_1$ in the storing state). It should be noted that any further switching of the signals SDA,SCL will have no effect on the latches 205$_3$, 205$_4$, since any subsequent corresponding switching of the signal Se$_3$,Se$_4$ may cause at most a transition from the reset state to the storing state of the latches 205$_3$,205$_4$ (and viceversa); in other words, the signals Q$_3$,Q$_4$, when de-asserted, are latched, i.e., maintained de-asserted during the whole assignment operation. In this way, within the sending of the first 5 address bits, the signals Q$_1$, Q$_2$, Q$_3$, Q$_4$ take, in the considered example, the configuration 1000.

In case that the pin P$_{PROG}$ is connected to the line VDD (see, in this respect, FIG. 3B), the signal Q$_1$ is de-asserted, as the latch 205$_1$ is reset. In addition, the signal Q$_2$ remains at the high logic level, since the latch 205$_1$ is in the storing condition. Moreover, at the first switching of the lines SDA,SCL to the low logic level, the signals Q$_3$ and Q$_4$ are de-asserted (latches 205$_3$,205$_4$ in the reset condition). As before, the signals Q$_3$ and Q$_4$, when de-asserted, are latched. In this way, within the sending of the first 5 address bits, the signals Q$_1$, Q$_2$, Q$_3$, Q$_4$ take the configuration 0100.

In case that the pin P$_{PROG}$ is connected to the line SDA (see, in this respect, FIG. 3C), the signal Q$_1$ is de-asserted (latch 205$_1$ reset) at a switching to the high logic level of the signal SDA. Instead, the signal Q$_3$ is always asserted, since the EXNOR gate 225$_3$, being input two signals at the same logic level, provides a signal always asserted to the OR gate 230$_3$ (latch 205$_3$ always in the storing condition). Furthermore, the signals Q$_2$ and Q$_4$ as well are de-asserted when the signals being input to the respective EXNOR gates 225$_2$ and 225$_4$ are different. In this way, within the sending of the first 5 address bits, the signals Q$_1$, Q$_2$, Q$_3$, Q$_4$ take the configuration 0010.

At the end, in case that the pin P$_{PROG}$ is connected to the line SCL (see, in this respect, FIG. 3D), the signal Q$_4$ remains always asserted, since the EXNOR gate 225$_4$, being input two signals always at the same logic level, provides a signal asserted to the OR gate 230$_4$ (latch 205$_{4_3}$ always in the storing condition). Instead, the signals Q$_1$, Q$_2$ and Q$_3$ are de-asserted as soon as the signals being input to the respective EXNOR gates 225$_1$, 225$_2$ and 225$_3$ are different. In this way, within the sending of the first 5 address bits, the signals Q$_1$, Q$_2$, Q$_3$, Q$_4$ take the configuration 0001.

At this point, the assignment operation ends when the decoder 235 provides (to the respective interface block, not shown) the corresponding 7-bit address from the signals Q$_1$, Q$_2$, Q$_3$, Q$_4$.

The described solution is advantageous as it ensures the assignment (i.e., the calculation of the signals Q$_1$, Q$_2$, Q$_3$, Q$_4$ and the decoding of the address ADD starting from such signals Q$_1$, Q$_2$, Q$_3$, Q$_4$) at each communication start (and within a comparison interval included between the sending of the first fixed bit and the last fixed bit); this is performed by timings of the signals being input to the latches such as to not have overlapping (the reset condition of the latches is obtained only after the signal D is asserted, thus avoiding the indeterminacy condition of the latch). In addition, such timings are not obtained through the use of RC delay circuits (which are typically sensitive to process and/or temperature variations), but through time variations of the signals SDA, SCL. Therefore, the described solution is entirely manageable and controllable within a digital design flow of the slave electronic device wherein it is used.

Naturally, in order to satisfy local and specific requirements, a person skilled in the art may apply to the solution described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details (such as the numeric examples) set forth in the preceding description for providing a more thorough understanding thereof; on the contrary, well known features may have been omitted or simplified in order not to obscure the description with unnecessary particulars. Moreover, it is expressly intended that specific elements and/or method steps described in connection with any disclosed embodiment of the invention may be incorporated in any other embodiment as a matter of general design choice.

For example, analogous considerations apply if the electronic device has a different structure or includes equivalent components, or it has other operating features. In any case, any component thereof may be separated into several elements, or two or more components may be combined into a single element; in addition, each component may be replicated for supporting the execution of the corresponding operations in parallel. It should also be noted that any interaction between different components generally does not need to be continuous (unless otherwise indicated), and it may be both direct and indirect through one or more intermediaries. For example, the electronic device may include more assignment blocks, each one of which able to provide, for example, a corresponding portion of the address, both in parallel and in serial way (with the synchronization among such assignment blocks that may be obtained by exploiting the clock signal provided by the master electronic device or by providing for auxiliary synchronization elements). Moreover, although in the present description explicit reference has been made to slave electronic devices, this should not be understood in a restrictive way; in fact, according to the used communication protocol, the slave electronic devices may also take master functions.

Although in the description reference has been made to a binary encoding, i.e. which only provides for two logical levels, the same considerations apply with an encoding of information in a different base; for example, it is possible to use ternary or quaternary signals, and in such case the electronic device may be provided, in addition or in alternative to that described above, with functional elements able to distinguish the different logical levels among each others.

Moreover, the number of programming pins (or any other equivalent terminals) is not limitative of the present invention, and it may be chosen, for example, according to the number and type of the used comparison signals. In any case, it is also possible to provide for the use of multiple programming terminals, for example, in case the implementation of very large number of addresses is desired.

The comparison signals do not necessarily include operative signals coming from the bus; for example, at least part of the comparison signals may be generated within each electronic device (for example, by simply negating the available signals, or generating the comparison signals from the clock signal).

In this respect, it should be noted that the communication protocol wherein the electronic device according to embodiments are usable may also be not of the I2C type; for example, it is possible to provide the use of the UART ("Universal Asynchronous Receiver/Transmitter") protocol, SPI ("Serial Peripheral Interface"), or 1-Wire protocol.

In general, the sequential and combinatory network described for implementing the described operation of the assignment block may also be implemented differently; for example, the EXNOR gates implementing the comparison means for generating the equality signals may be replaced by elements functionally equivalent thereto (e.g., comparators, comparators with hysteresis, etc.). Similar considerations apply also to the latches that implement latching means for latching the de-assertion of the equality signals, which may be replaced by flip-flops or memory cells, for the decoder, which may be replaced, for example, by a PLA ("Programmable Logic Array") network and for the OR gates.

In addition, it should be noted that in general the assignment block may be implemented in negated logic (for example, by using EXOR gates, NOR gates and low-active latches). Moreover, the assignment block may also include additional components to meet specific design needs; for example, since, in the implementation phase of the electronic device, the power line, the ground line, and the bus may couple with each other thereby creating noises on the signals carried by them (e.g., voltage spurious pulses, or glitches), it is possible to provide for the use of filtering elements able to eliminate, or at least reduce, such noises, so as not to affect the correct operation of the assignment block. Advantageously, such filtering elements may be placed between each output terminal of the EXNOR gate and the input terminal of the OR gate (i.e., for filtering the equality signal).

The initialization of the signals output from the latches is not constrained to the previously indicated value (signals being all asserted); for example, in case the assignment block is implemented in negated logic, such signals may all be de-asserted. Anyway, other intermediate configurations are also possible according to specific design needs.

Moreover, similar considerations apply if the electronic system has a different structure or includes equivalent components (either separated or combined to each other, in whole or in part); for example, the electronic system may include several master electronic devices, if the implemented communication protocol allows that.

Moreover, the invention lends itself to be implemented through an equivalent method (by using similar steps, removing some steps being not essential, or adding further optional steps); moreover, the steps may be performed in different order, concurrently or in an interleaved way (at least partly).

It should be readily understood that the proposed structure may be part of the design of an integrated circuit. The design may also be created in a programming language; moreover, if the designer does not manufacture the electronic devices or the masks, the design may be transmitted by physical means to others. In any case, the resulting integrated circuit may be distributed by its manufacturer in raw wafer form, as a bare die, or in packages. Moreover, the proposed structure may be integrated with other circuits in the same chip, or it may be mounted in intermediate products (such as mother boards) and coupled with one or more other chips (such as a processor). In any case, the integrated circuit is suitable to be used in complex systems.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. An electronic device having a device address associated therewith, the electronic device comprising:
   a plurality of device terminals comprising a plurality of operative terminals configured to receive corresponding operative signals comprising at least one of a data signal and a synchronization signal, and a plurality of reference terminals configured to receive corresponding reference voltages comprising at least one of a supply voltage and a ground voltage;
   at least one programming terminal; and
   assignment circuitry coupled to said plurality of device terminals and said programming terminal and configured to
      receive a plurality of comparison signals, via said plurality of device terminals, corresponding to at least one of the operative signals and the reference voltages, and a programming signal via said at least one programming terminal, the programming signal corresponding to any of the plurality of comparison signals and at least one of the operative signals varying over a given time period during operation,
      perform a plurality of comparisons over the given time period between the plurality of comparison signals and the programming signal to recognize the programming signal as being one of the plurality of comparison signals, the plurality of comparison signals also being for respective device functions that are different than the plurality of comparisons, and
      generate the device address based upon the programming signal being equal to the one of the plurality of comparison signals, the device address having a number of programmable address bits thereof that are determined based upon the programming signal, the number of bits being greater than a quantity of the at least one programming terminal.

2. The electronic device according to claim 1, wherein the programming signal and the plurality of comparison signals each correspond to a number B of predefined values, and wherein the programmable address bits correspond to one of a number N of predefined values with $N>B^P$, wherein P is the quantity of the at least one programming terminal.

3. The electronic device according to claim 1, wherein said at least one programming terminal comprises a plurality of programming terminals.

4. The electronic device according to claim 1, wherein the data signal and a synchronization signal are based upon an I2C communications protocol.

5. The electronic device according to claim 1, wherein said assignment circuitry is further configured to
   generate an equality signal corresponding to the programming signal, the equality signal being de-asserted and asserted when the programming signal is different from and equal, respectively, to one of the plurality of comparison signals,
   receive the corresponding equality signal and provide a corresponding address signal by de-asserting and latching the address signal in response to the equality signal being de-asserted, and
   determine the device address based upon latched address signals that remain asserted at end of the given time period.

6. The electronic device according to claim 5, wherein said assignment circuitry is further configured to assert the corresponding address signal based upon a change in the operative signals.

7. An electronic system comprising:
   a communication bus;
   a plurality of electronic devices coupled to said communications bus, each of said plurality of electronic devices comprising
      a plurality of device terminals comprising a plurality of operative terminals configured to receive corresponding operative signals comprising at least one of a data signal and a synchronization signal, and a plurality of reference terminals configured to receive corresponding reference voltages comprising at least one of a supply voltage and a ground voltage,
      at least one programming terminal, and
      assignment circuitry coupled to said plurality of device terminals and said programming terminal and configured to
         receive a plurality of comparison signals, via said plurality of device terminals, corresponding to at least one of the operative signals and the reference voltages, and a programming signal via said at least one programming terminal, the programming signal corresponding to any of the plurality of comparison signals and at least one of the operative signals varying over a given time period during operation,
         perform a plurality of comparisons over the given time period between the plurality of comparison signals and the programming signal to recognize the programming signal as being one of the plurality of comparison signals, the plurality of comparison signals also being for respective device functions that are different than the plurality of comparisons, and
         generate the device address based upon the programming signal being equal to the one of the plurality of comparison signals, the device address having a number of programmable address bits thereof that are determined based upon the programming signal, the number of bits being greater than a quantity of the at least one programming terminal; and
   at least one control device configured to address each of the plurality of electronic devices based upon the corresponding device address and through said communication bus.

8. The electronic system according to claim 7, wherein the programming signal and the plurality of comparison signals each correspond to a number B of predefined values, and wherein the programmable address bits correspond to one of a number N of predefined values with $N>B^P$, wherein P is the quantity of the at least one programming terminal.

9. The electronic system according to claim 7, wherein said at least one programming terminal comprises a plurality of programming terminals.

10. The electronic system according to claim 7, wherein the data signal and a synchronization signal are based upon an I2C communications protocol.

11. The electronic system according to claim 7, wherein said assignment circuitry is further configured to
- generate an equality signal corresponding to the programming signal, the equality signal being de-asserted and asserted when the programming signal is different from and equal, respectively, to one of the plurality of comparison signals,
- receive the corresponding equality signal and provide a corresponding address signal by de-asserting and latching the address signal in response to the equality signal being de-asserted, and
- determine the device address based upon latched address signals that remain asserted at end of the given time period.

12. The electronic system according to claim 11, wherein said assignment circuitry is further configured to assert the corresponding address signal based upon a change in the operative signals.

13. A method of programming an electronic device having a device address associated therewith, the method comprising:
using assignment circuitry to
- receive a plurality of comparison signals from a plurality of device terminals comprising a plurality of operative terminals configured to receive corresponding operative signals comprising at least one of a data signal and a synchronization signal, and a plurality of reference terminals configured to receive corresponding reference voltages comprising at least one of a supply voltage and a ground voltage, the plurality of comparison signals corresponding to at least one of the operative signals and the reference voltages,
- receive a programming signal from at least one programming terminal, the programming signal corresponding to any of the plurality of comparison signals and at least one of the operative signals varying over a given time period during operation,
- perform a plurality of comparisons over the given time period between the plurality of comparison signals and the programming signal to recognize the programming signal as being one of the plurality of comparison signals, the plurality of comparison signals also being for respective device functions that are different than the plurality of comparisons, and
- generate the device address based upon the programming signal being equal to the one of the plurality of comparison signals, the device address having a number of programmable address bits thereof that are determined based upon the programming signal, the number of bits being greater than a quantity of the at least one programming terminal.

14. The method according to claim 13, wherein the programming signal and the plurality of comparison signals each correspond to a number B of predefined values, and wherein the programmable address bits correspond to one of a number N of predefined values with $N>B^P$, wherein P is the quantity of the at least one programming terminal.

15. The method according to claim 13, wherein receiving the programming signal from the at least one programming terminals comprises receiving the programming signal from a plurality of programming terminals.

16. The method according to claim 13, wherein the data signal and a synchronization signal are based upon an I2C communications protocol.

17. The method according to claim 13, further comprising using the assignment circuitry to
- generate an equality signal corresponding to the programming signal, the equality signal being de-asserted and asserted when the programming signal is different from and equal, respectively, to one of the plurality of comparison signals,
- receive the corresponding equality signal and provide a corresponding address signal by de-asserting and latching the address signal in response to the equality signal being de-asserted, and
- determine the device address based upon latched address signals that remain asserted at end of the given time period.

18. The electronic device according to claim 17, further comprising using the assignment circuitry to assert the corresponding address signal based upon a change in the operative signals.

* * * * *